(No Model.)
C. H. MUCKENHIRN.
WASTE TRAP.
No. 470,647.                   Patented Mar. 8, 1892.
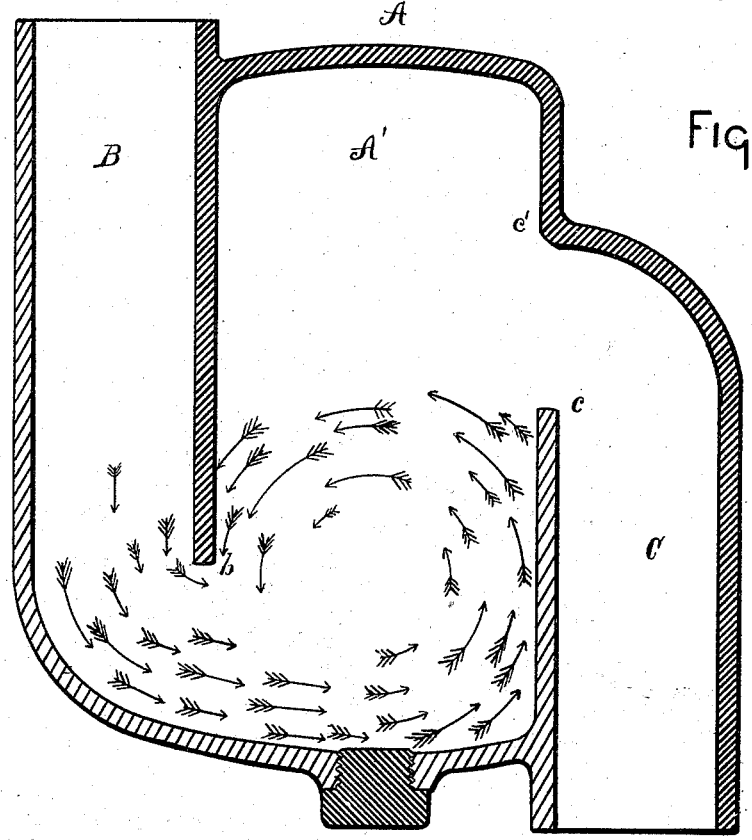
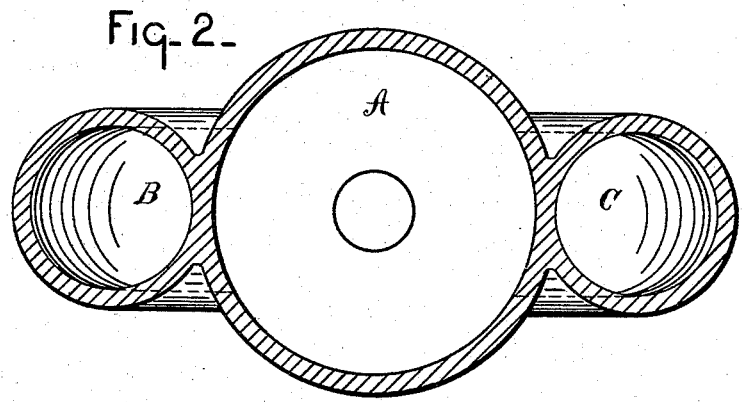
WITNESSES
F. Clough.
D. W. Bradford
INVENTOR
Charles H. Muckenhirn
By Willis W. Leggett
Attorney.

United States Patent Office.

CHARLES H. MUCKENHIRN, OF DETROIT, MICHIGAN, ASSIGNOR OF TWO-THIRDS TO JOHN BINGEN AND AMIEL J. SPRINGBORN, OF SAME PLACE.

WASTE-TRAP.

SPECIFICATION forming part of Letters Patent No. 470,647, dated March 8, 1892.

Application filed February 24, 1891. Serial No. 382,318. (No model.)

*To all whom it may concern:*

Be it known that I, CHARLES H. MUCKENHIRN, a citizen of the United States, residing at Detroit, county of Wayne, State of Michigan, have invented a certain new and useful Improvement in Waste-Traps; and I declare the following to be a full, clear, and exact description of the invention, such as will enable others skilled in the art to which it pertains to make and use the same, reference being had to the accompanying drawings, which form a part of this specification.

In the drawings, Figure 1 is a side elevation of a trap embodying my invention. Fig. 2 is a cross-section of the same by a horizontal plane.

It is the object of my invention to produce a waste-trap which shall obviate wholly under all circumstances the liability of having its water seal broken by siphonage—that is to say, either due to the siphonage produced by the flow of water through the trap and its outlet-pipe or to the siphonage due to suction at the discharge end of the discharge-pipe when the trap is not itself being directly employed. It is well known that this siphonage takes place under both of the circumstances above recited—that is to say, when water is being passed through the trap itself the column of water in its discharge-leg operates to draw out and empty the trap and so breaks its water seal. So, also, when the trap is at rest with its water seal it is frequently emptied by siphonage caused by the flowing of water in a pipe into which its outlet leads, the said flow of water operating to create a vacuum in the long leg of the trap. I have discovered after many experiments that I can overcome this liability of the trap to have its water seal broken by siphonage by constructing the trap with certain definite proportions and that the same proportions are essential to enable the trap to operate as a self-cleaner. I have also discovered that any substantial variations from these proportions will either permit the seal to be broken by siphonage or will prevent its operating as a self-cleaner.

In carrying out my invention, A represents the body of my trap, B its inlet-duct, and C its outlet-duct. I make the parts in the following proportions: The body A, I make circular or substantially circular in horizontal cross-section, and its diameter is twice the diameter of the inlet-duct and the outlet-duct is of the same diameter as the inlet-duct. I also locate the upper edge $b$ of the inlet-duct at a distance below the lower edge $c$ of the outlet-duct equal to the diameter of the inlet-duct. I also continue the upper portion of the body A above the upper point $c'$ of the outlet-duct a distance equal to the diameter of the inlet or outlet duct. This divides the body A so that one-quarter of its length shall be from the base to the level of $b\ b$, one-quarter of its space shall be between the levels $b$ and $c$, one-quarter of its space shall be between the levels $c$ and $c'$, and the remaining quarter shall be above the level $c'$. I have discovered that if the space between the levels $b$ and $c$ is greater than the diameter of the inlet-duct the water flowing into the inlet-duct will circulate about the base of the body only and will not lift the sand or sediment to a point higher than the diameter of the body measured upward from the base of said body, but will simply cause the same to eddy around and around within those limits. This results in leaving much of the sediment within the trap after each flow of water through the trap. On the other hand, I have discovered that where the dimensions are as shown in my drawings—that is to say, where the level $c$ is at a height of the horizontal diameter of the body measured upward from its base—all this sediment will be circulated and will be discharged over the edge C, thus not only emptying the trap of all its sediment, but thoroughly scouring the trap up to the level $c$, at which water can rest within it. Again, I have discovered that the air entering through the inlet-duct when there is a violent suction in the outlet-duct will, in ordinary traps, throw the water to the top of the trap, and if the top is shaped so as to direct it into the outlet-duct much of it will pass into the said duct and be wasted, thus frequently breaking the water seal; but by locating the chamber A′ above the point $c'$ the water which is thus shot up into the upper end of the trap is by the shoulder above $c'$ prevented from shooting out into the exit-duct and is caused to fall directly back into the bottom of the body A, and that siphonage is thus effectually prevented from breaking the water seal.

I am aware that traps have been made approximating in shape the trap here illustrated; but I am not aware that a trap has ever before been made in which the dimensions have been accurately determined and proportioned as the result of actual demonstration, so as to accomplish with certainty the maintaining of the seal and the self-scouring of the trap throughout.

What I claim is—

1. A trap composed of the body A and inlet and outlet ducts B C, said body and ducts being substantially circular in cross-section, the ducts B and C being of equal diameters and the diameter of the body being twice the diameter of the inlet or outlet duct, and with space between the levels $b$ and $c$ equal to the diameter of the inlet or outlet duct, whereby a self-scouring trap is produced, substantially as described.

2. A trap in which the inlet and outlet ducts and body of the trap are substantially circular in cross-section, the diameter of the body being twice that of the inlet-duct and the inlet and outlet ducts being of equal diameters, with a space between the levels $b$ and $c$ equal to the diameter of the inlet-duct, and the top of the body projected with the same diametrical dimensions to a level above the point $c'$ equal to the diameter of the inlet-duct, substantially as and for the purposes described.

In testimony whereof I sign this specification in the presence of two witnesses.

CHARLES H. MUCKENHIRN.

Witnesses:
MARION A. REEVE,
W. W. LEGGETT.